Patented Apr. 12, 1938

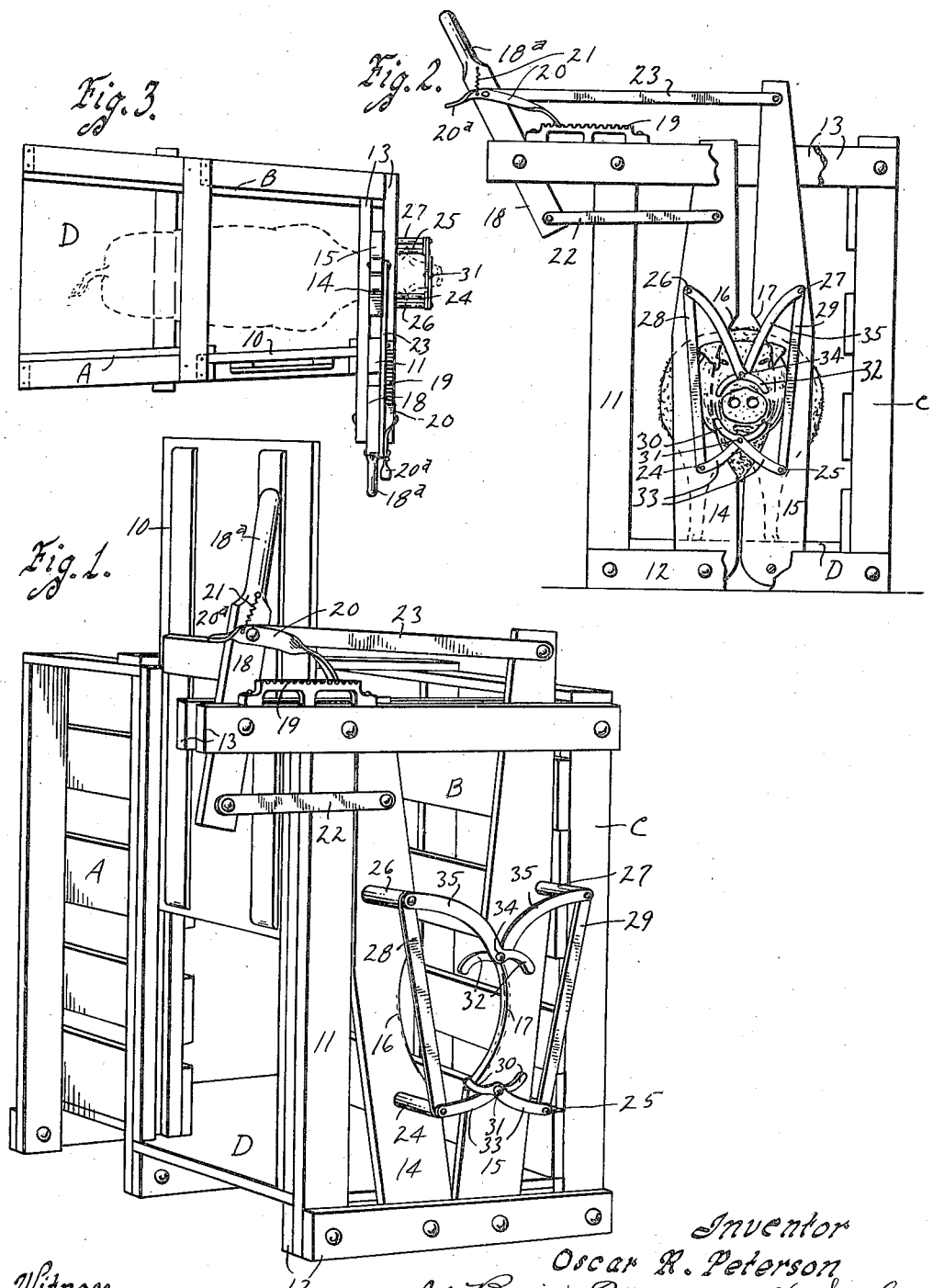

2,113,741

UNITED STATES PATENT OFFICE 2,113,741

ANIMAL CRATE

Oscar R. Peterson, Low Moor, Iowa

Application May 19, 1936, Serial No. 80,526

4 Claims. (Cl. 119—99)

My invention relates to a crate to be used for the convenient handling of animals, particularly hogs.

More particularly, it is my object to provide a crate which is especially adapted for holding hogs for ringing them and may be used for other work by veterinarians.

Especially it is my purpose to provide a crate in which a hog may be held at the neck, and which crate also has means for holding the snout of the animal for convenience in ringing it.

Another purpose is to provide such a crate having neck holding means and snout holding means adapted to be simultaneously actuated.

With these and other objects in view, my invention consists in the construction, arrangement and combination of the various parts of my animal crate, whereby the objects contemplated are attained, as hereinafter more fully set forth, pointed out in my claims, and illustrated in the accompanying drawing, in which:

Figure 1 is a perspective view of an animal crate embodying my invention.

Figure 2 is a front elevation of the same; and

Figure 3 is a top or plan view of the crate.

Generally speaking, my crate has two sides A and B, and a front C, and I preferably provide it with a floor D.

The rear side may be provided with a gate if desired or may be set at a gate or door.

The side A near the front has a vertically sliding door 10.

The parts just described may be of such material and structure as may be desired.

The front C may have the laterally spaced uprights 11.

In the particular form of structure disclosed here, I provide at the bottom of the members 11 on the opposite sides thereof the transverse members 12.

At the top, I provide the transverse members 13 on opposite sides of the members 11 and projecting beyond the left-hand member 11 as shown.

Pivotally mounted between the members 12 are the lower ends of the neck clamp bars 14 and 15. The upper ends of the neck clamp bars 14 and 15 are arranged to slide between the members 13, and the member 15 projects above the members 13. The adjacent edges of the members 14 and 15 have parts cut out as at 16 and 17 to receive and grip the neck of a hog.

Pivoted between the leftward projecting portions of the members 13 is a lever 18, which projects both below and above the members 13 and has at its upper end the handle 18a.

Mounted on the frame member 13 adjacent the lever 18 and in position for proper cooperation is a notched ratchet bar 19.

Pivoted to the upper part of the lever 18 is a swinging pawl 20. A spring 21 secured to the pawl 20 and to the lever 18 yieldingly holds the pawl 20 in engagement with the rack bar.

In the particular form illustrated, the pawl extends to the right from the lever 18 and has a short portion 20a extending to the left, where it can be conveniently engaged for manipulating the pawl.

A link 22 is pivoted to the lower end of the lever 18 and to the upper part of the neck clamp bar 14. Another link 23 is pivoted to the upper part of the lever 18 and to the upwardly projecting end of the neck clamp bar 15.

It will be clear that by releasing the pawl 20 and swinging the handle 18a of the lever 18 laterally, the neck clamp bars 14 and 15 may be moved simultaneously toward each other or apart for gripping the neck of a hog or releasing the animal.

Projecting forwardly from the bars 14 and 15 just below the neck engaging portions 16 and 17 are posts 24 and 25. Projecting forwardly from the bars 14 and 15 above the portions 16 and 17 are similar posts 26 and 27. The posts 24 and 26 are preferably connected by a brace 28 and the posts 25 and 27 are preferably connected by a brace 29.

A lower pair of clamping jaws 30 are pivoted together at 31 and have the operating arms 33 pivoted to the respective posts 24 and 25 in such manner that when the bars 14 and 15 are swung toward each other, the jaws 30 move upwardly and toward each other.

A somewhat similar pair of clamping jaws 32 are pivoted together at 34 and have the arms 35 pivoted to the posts 26 and 27 in such manner that when the bars 14 and 15 are swung toward each other, the clamping jaws 32 move downwardly toward the jaws 30 and also move toward each other.

The jaws 30 and 32 are the snout clamping jaws. Since they are carried by the bars 14 and 15, it is obvious that operation of the neck clamp bars effects the operation of the snout clamping jaws.

Operation

In using my crate, the door 10 is lowered. The open end of the crate is set at the gate of the pen or at a door of a room, and a hog is driven from the pen or room into the crate. The hog can be crowded forwardly until it sticks its neck between the bars 14 and 15, whereupon the operator quickly swings the handle 18a to the left from its position shown in Figure 1. This movement tends to swing the upper ends of the bars 14 and 15 toward each other, and to cause them to grip the neck of the hog.

At the same time, the jaws 30 and 32 are moved toward each other and the respective jaws 30 are moved toward each other and the respective jaws 32 toward each other for gripping the snout of the hog.

The parts will then have been moved from their positions shown in Figure 1 to their positions shown in Figure 2. The ring can then be inserted in the hog's nose, the clamping bars of the snout jaws released, the door 10 raised and the hog driven out of the crate.

A crate of this kind has a good many advantages. It can be conveniently and easily moved from place to place, and thus put wherever it is desired to do the work with the animals.

The hog can easily be driven into the crate. The bars 14 and 15 may be set in the beginning, so that the particular hog can not squeeze out through the front of the crate. When the neck and the snout of the hog are gripped by the operative mechanism, the ringing operation can be done, and it is obvious that other operations may be performed on the hog, for instance, the hog may be inoculated and so on.

I do not desire to limit myself to the exact structure here shown, and it is my purpose to cover by my claims any modifications of the particular parts and arrangement thereof here illustrated, which may be reasonably included within the scope of my invention and of my claims.

I claim as my invention:

1. An animal crate having at one end pivoted neck engaging bars, members projecting forwardly from the bars, snout engaging jaws pivoted together and having arms pivoted to a pair of such members below the pivot of the jaws, and a second pair of snout engaging jaws pivoted together, having arms pivoted to another pair of said members above the pivot of the last-named pair of jaws.

2. An animal crate having at one end movable neck engaging bars and having at the same end movable snout engaging jaws, means for operatively connecting the snout engaging jaws with the bars, whereby when the bars are actuated for gripping the neck of an animal from the sides, the jaws are actuated for gripping the snout from above and below.

3. An animal crate having at one end a pair of hinged neck clamping bars, movable snout engaging jaws, and means connecting said neck clamping bars and snout engaging jaws to make them simultaneously relatively movable for engaging the neck and snout of an animal.

4. An animal crate having at one end movable neck engaging bars and having at the same end snout engaging jaws arranged for movement relative to each other and relative to the movement of the neck engaging bars, the bars and jaws being operatively connected, whereby actuation of the bars for gripping the neck of an animal effects relatively this movement of the jaws for gripping the snout of the animal.

OSCAR R. PETERSON.